Figure 3:
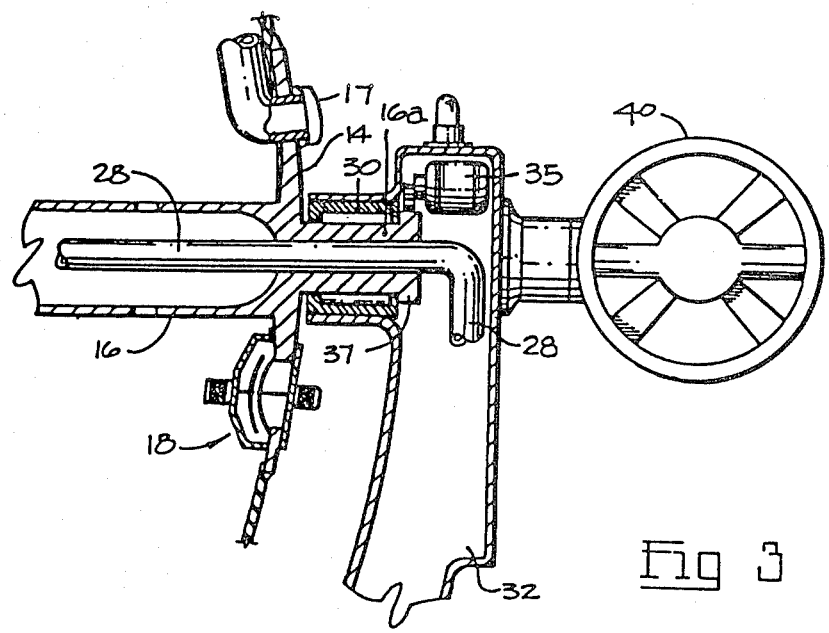

United States Patent [19]

Ferguson

[11] 4,366,936
[45] Jan. 4, 1983

[54] AIRCRAFT HAVING BUOYANT GAS BALLOON

[76] Inventor: Frederick D. Ferguson, c/o Van Dusen Commercial Development Corporation, P.O. Box 1151, Station "B", Ottawa, Ontario, Canada

[21] Appl. No.: 318,248

[22] Filed: Nov. 4, 1981

Related U.S. Application Data

[63] Continuation-in-part of Ser. No. 64,286, Aug. 6, 1979, abandoned.

[51] Int. Cl.³ .................. B64B 1/02; B64B 1/58
[52] U.S. Cl. ........................... 244/2; 244/24; 244/30; 244/36; 244/39; 244/97; 244/127; 416/84
[58] Field of Search ............... 244/3, 2, 25, 17 D, 244/24, 26, 29, 30, 31, 33, 36, 10, 21, 39, 34 R, 127, 93, 12.2, 97, 137 R, 137 P; 440/100; 416/4, 197 A, 84

[56] References Cited

U.S. PATENT DOCUMENTS

| | | | |
|---|---|---|---|
| 804,593 | 11/1905 | Friedel | 244/93 |
| 998,538 | 7/1911 | Lehmann | 244/97 |
| 1,426,726 | 8/1922 | Gilbert | 244/127 |
| 1,665,533 | 4/1928 | Dally | 244/21 |
| 1,905,345 | 4/1933 | Dandini | 440/100 |
| 2,039,676 | 5/1936 | Zaparka | 244/21 |
| 3,017,138 | 1/1962 | Flint | 244/3 |
| 4,195,694 | 4/1980 | Gizzarelli | 244/137 R |

FOREIGN PATENT DOCUMENTS

| | | | |
|---|---|---|---|
| 2922059 | 6/1979 | Fed. Rep. of Germany | 244/96 |
| 482466 | 3/1917 | France | 416/197 A |
| 856153 | 12/1960 | United Kingdom | 244/1 TD |

*Primary Examiner*—Galen L. Barefoot
*Attorney, Agent, or Firm*—Beveridge, DeGrandi & Kline

[57] ABSTRACT

An airship is provided utilizing a spherical balloon filled with buoyant gas such as helium at a pressure substantially greater than atmospheric so that its dimensions are substantially unaffected by changes in atmospheric pressure or temperature. The spherical balloon is rotatably mounted on a normally horizontal axle having end portions projecting from opposite sides of the balloon, and includes a rigid load supporting yoke including two arms extending upwardly from a central load supporting structure and each with an upper end suspended from the axle. The yoke arms carry engines which propel the airship in a forward direction transverse to the axle, and means are provided for rotating the balloon about the axle so that the balloon front surface moves upward relative to the centre of the balloon and provides lift due to the Magnus effect.

30 Claims, 6 Drawing Figures

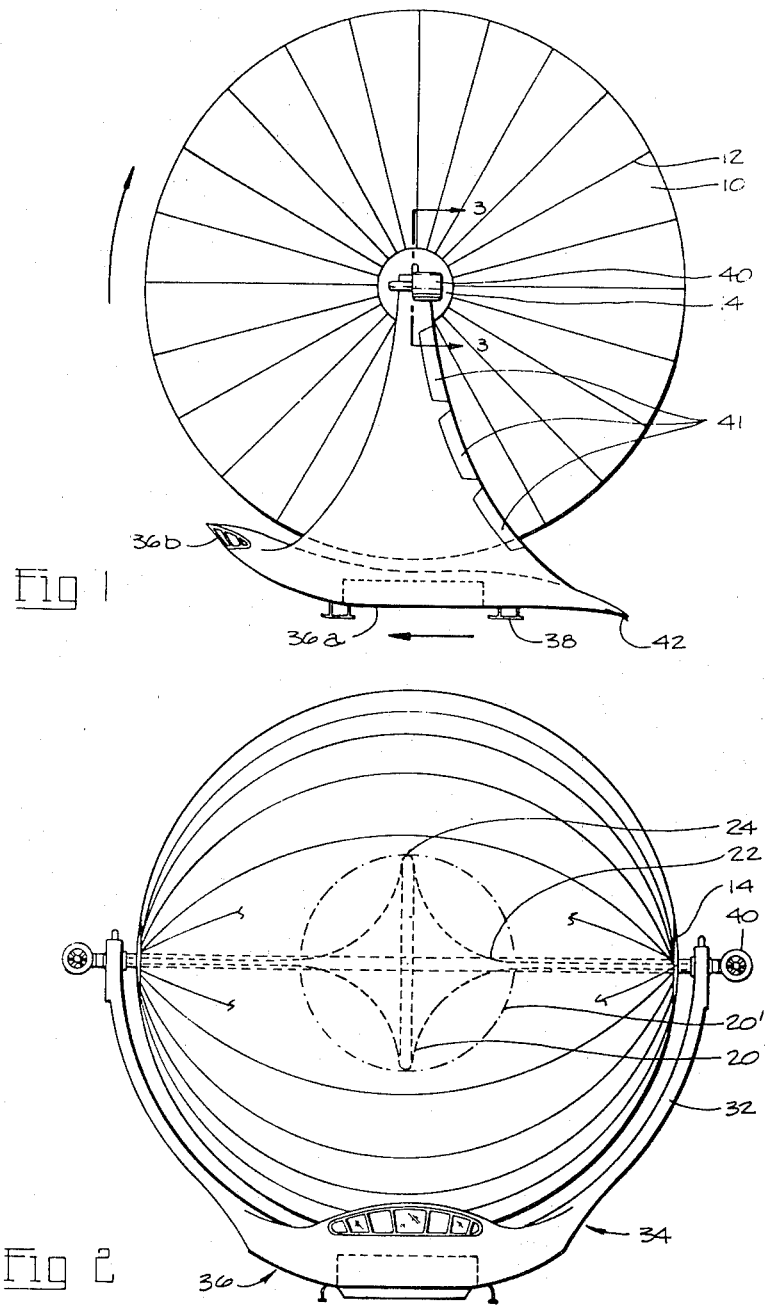

AIRCRAFT HAVING BUOYANT GAS BALLOON

This application is a continuation-in-part of my prior Application Ser. No. 64,286, filed Aug. 6, 1979 now abandoned.

The present invention relates to an aircraft in which the major part of the lift is provided by a body of buoyant gas, i.e., a gas lighter than air, for example helium. The aircraft is in the form of a self-propelled and steerable airship (a dirigible).

Conventionally, airships have been made with the buoyant gas held in gas bags contained within an elongated enclosure, in order to minimize air resistance. An elongated shape of this kind however has some disadvantages especially in large sizes.

Firstly, to achieve good aerodynamic shape in a large airship, a rigid structure is required which contains numerous gas bags and which defines the exterior shape of the airship, and such a structure is quite expensive. Small airships, the so-called blimps, are made without any rigid structure but these cannot be made in an ideal streamlined shape.

A major drawback of conventional airships is the difficulty or mooring and loading a large airship in other than very calm weather, due to the tendency of the craft to act as a weather-vane and to swing about with changes in wind direction.

Airships have hitherto used bags of buoyant gas substantially at atmospheric pressure. These bags expand and contract depending on the surrounding atmospheric pressure and temperature, so that the volume of the bags depends both on the weather conditions and on the height of the airship, giving wide fluctuations in the available lift. This means that airship operations are conventionally very much weather dependent, and for example an airship may have to wait until the air temperature has warmed sufficiently before it can take off.

The airship of my invention avoids these difficulties by the use of a single, spherical, balloon which contains the buoyant gas (normally helium) at a pressure sufficiently high that the shape and size of the balloon is substantially unaffected by normal changes in atmospheric pressure and temperature, even when the balloon has little or no internal supporting structure.

Balloons containing buoyant gas at pressures substantially higher than atmospheric, so-called "superpressure" balloons, have previously been used as free flight balloons for atmospheric monitoring. The use of a manned balloon of this type as part of a project termed ATMOSAT is described in the APCA Journal, Vol. 27, No. 6 of June 1977. The balloon used was ten meters in diameter and made of a sandwich of materials including an inner layer of Kevlar cloth, a layer of bilaminated Mylar, and an outer sheet of aluminized Mylar. Kevlar is a Trade Mark of DuPont for a polyester fibre; Mylar is a Trade Mark for a polyester made in thin sheets and having great tensile strength.

The superpressure balloons so far made have been free flight balloons having a gondola suspended below the balloon by a series of cables which are attached to tabs spaced around the lower part of the balloon. The balloon fabric is strong enough to hold these suspension means without the usual load bearing net being placed over the top of the balloon. It is reported that the performance of these ATMOSAT balloons displayed extreme stability, the internal pressurization being sufficient to allow them to overcome any atmospheric perturbations which might otherwise have caused the balloon to change altitude and disturb the measurements.

The airship of my invention utilizes a spherical, superpressure balloon of similar nature and fabric to that of the ATMOSAT balloon, but the manner by which the load is suspended from the balloon is quite different from the more conventional arrangement used in the ATMOSAT, and allows a number of important novel features to be incorporated in my airship.

The term "superpressure balloon" as used herein means a balloon of non-elastic material, having essentially fixed dimensions and shape which, once the balloon is properly inflated, do not change by reason of the type of changes in external pressure and temperature which occur with normal atmospheric changes and changes in altitude. A superpressure balloon is normally designed to accommodate safely an internal pressure of say 35 millibars above atmospheric pressure, so that the balloon can be launched with a pressure slightly above atmospheric pressure and fly at least several thousand feet without losing the buoyant gas (helium). Depending on size, however, a superpressure balloon may accommodate pressures of over 100 millibars above the surrounding pressure, and special materials may be used to increase this pressure to say 300 millibars or more. The fabric used for these superpressure balloons may have strength between 175 lb/in and 700 lb/in, depending on internal pressure to be used and depending on diameter. The airship of this invention will preferably use a balloon strong enough that it can be filled with helium at ground level and can hold all the helium while operating at up to 15,000 ft. which will be the maximum altitude for unloaded flight. Although provision is made for dumping helium in the event of excess internal/external pressure differential, it is not envisaged that dumping will normally occur. However, there will be some normal reduction of helium pressure with increasing altitude due to release of air from a ballonet which is contained within the balloon, as described below.

In accordance with one aspect of my invention, an aircraft or airship comprises a superpressure, non-elastic balloon for containing a buoyant gas and having essentially fixed dimensions and shape, and a rigid load supporting yoke suspended from the balloon during flight, the load supporting yoke comprising two arms extending upwardly from central load engaging means to connection means on opposite sides of the balloon centre, these connection means being aligned with a normally horizontal axis through the balloon centre and allowing rotation of the balloon about the said normally horizontal axis; in this way any twisting forces in the balloon adjacent the connecting means are minimized.

Means are provided for propelling the airship through the air in a forward direction transverse to the axis, and means are provided for rotating the balloon about the horizontal axis in such direction that the surface of the balloon facing the forward direction moves upward relative to the centre of the balloon to generate lift due to the so-called Magnus effect.

The connection means also preferably include the axle passing through the centre of the balloon; this is not only convenient for rotation, but additionally adds structural strength to the airship, and holds the correct spacing of the load supporting arms. The axle need not however be rigid and may be merely a cable or such means capable of resisting tension.

The yoke arms provide a rigid connection between the load engaging means or gondola and the balloon.

With this arrangement, turning or propelling forces applied to the load supporting yoke are suitably transmitted to the balloon without any flexible cables intervening and conversely when the airship is moored the balloon is held rigidly to the load engaging means. However, it is preferred that the propulsion means are located close to the upper ends of the yoke arms so that the forces are most directly transmitted to the connection means and thus to the balloon.

The arms of the load supporting yoke are curved to conform with the balloon curvature and to support the load engaging means in such position that the gap separating the outer surface of the balloon from the adjacent surface of the structure is less than one third the balloon radius, and preferably much less, say less than one tenth and desirably of the order of two percent of the balloon radius.

The arms of the load supporting means may constitute two halves of a semi-circular or similarly curved load supporting yoke.

As indicated the balloon is preferably rotated in normal flight in such direction that the surface of the balloon facing its forward direction of movement moves upwards relative to the centre of the balloon, so that the rotation supplies additional lift to the airship due to the Magnus effect. This allows for operation at a greater height and thus reduces drag otherwise prevailing. The lift effect can be increased by the use of a non-smooth surface, for example a roughened or ribbed surface, on the balloon. A desirable ribbed or dimpled effect can be achieved by suitable arrangements of reinforcing cabling with pillowing of the balloon fabric between the cables.

The means for rotating the balloon are preferably mounted within one or both of the arms of the load supporting yoke.

It has previously been proposed in accordance with Canadian Pat. No. 153,756 which issued to Hutson to provide an airship with a rotating structure or "wheel" containing independently inflatable compartments or gas bags. The purpose of rotation was primarily to prevent over-heating of the gas contained in the gas bags, although it is stated "This large rotating wheel also forces the air downwardly during the forward movement of the machine and occasions a lifting impulse". Actually, rotation as described would not produce a lifting impulse but rather the opposite. Also, it is believed that a large rotating wheel containing separate gas bags as suggested by this patent is not a practical proposition since the gas bags, being constantly subjected to lifting forces, will tend to move or expand towards the top of the wheel as this is rotated upsetting the balance of the wheel, causing oscillations, and making this difficult to rotate. Further, it is to be noted that in this prior patent the means for rotation are not contained in the yoke arms but include a cable which encircles the periphery of the wheel.

It has also been proposed according to French Pat. No. 482,466 to Vinet to provide an airship with a spherical balloon rotatable about a transverse axle, the balloon being rotated by vanes on its surface. However, as with Hutson, the rotational direction suggested would not produce a Magnus lift but rather the reverse. Also, the gondola of the Vinet airship is suspended by cables and there is no rigid load supporting yoke providing a rigid connection between the gondola and the balloon.

The buoyancy of the balloon of my airship (and hence the lifting forces) can best be regulated by an air containing ballonet within the balloon, connected to a compressor capable of forcing air into the ballonet against the pressure of buoyant gas to expand the ballonet and thereby to reduce the volume of buoyant gas. The ballonet may provide the sole means for regulating the altitude of the airship. In a preferred arrangement, two ballonets are used, one at each side of the balloon adjacent the connection point with the upper ends of the yoke arms.

Figure 4:
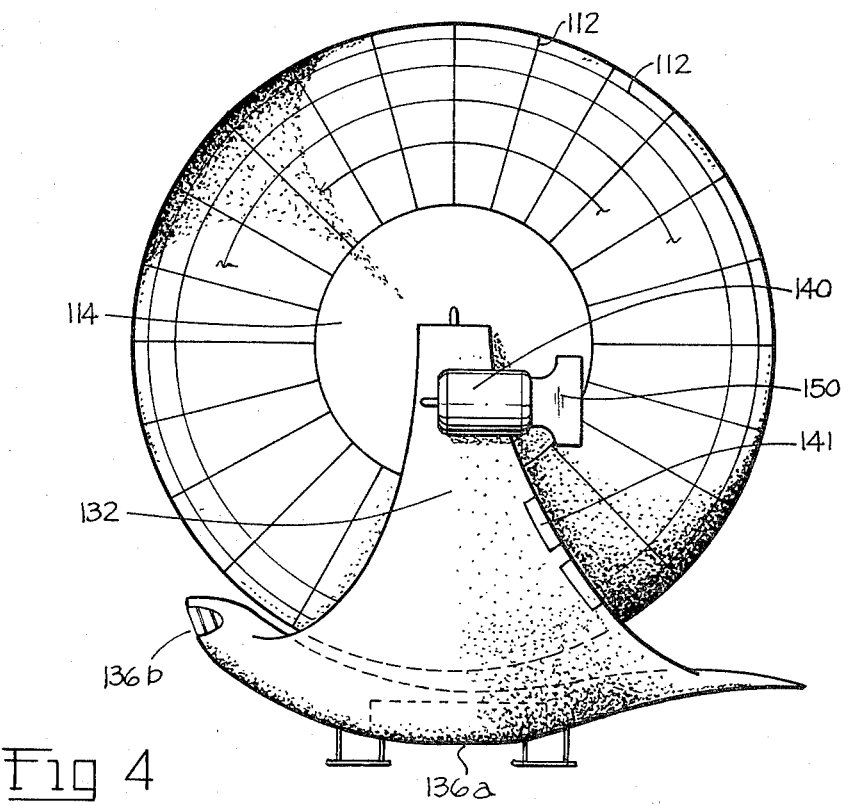
Figure 5:
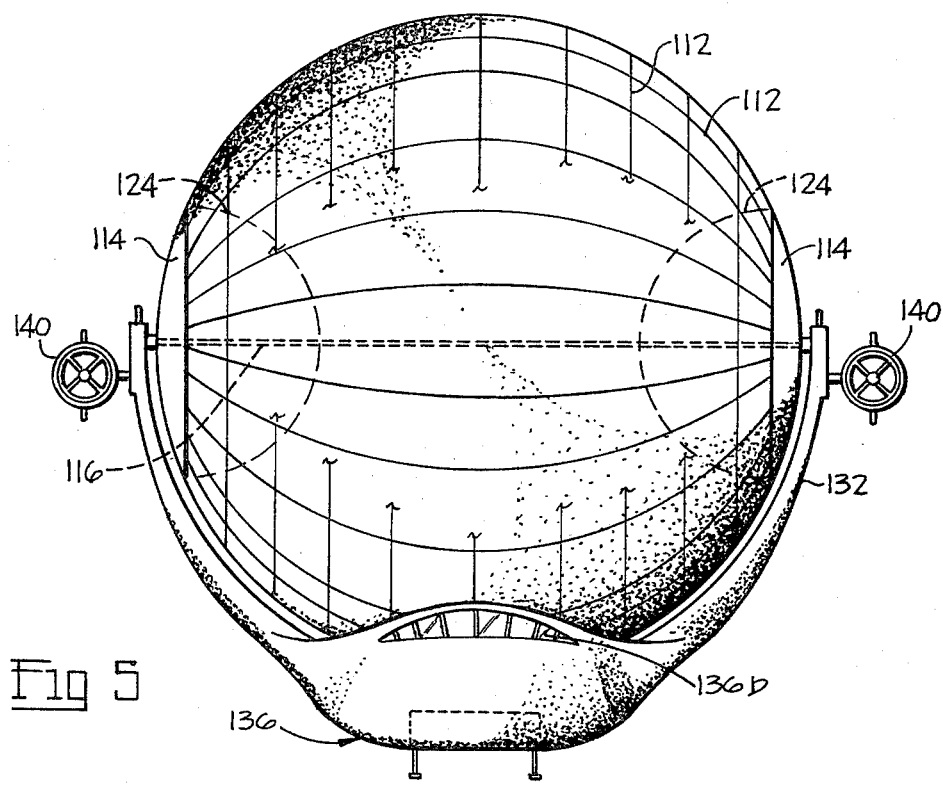
Figure 6:
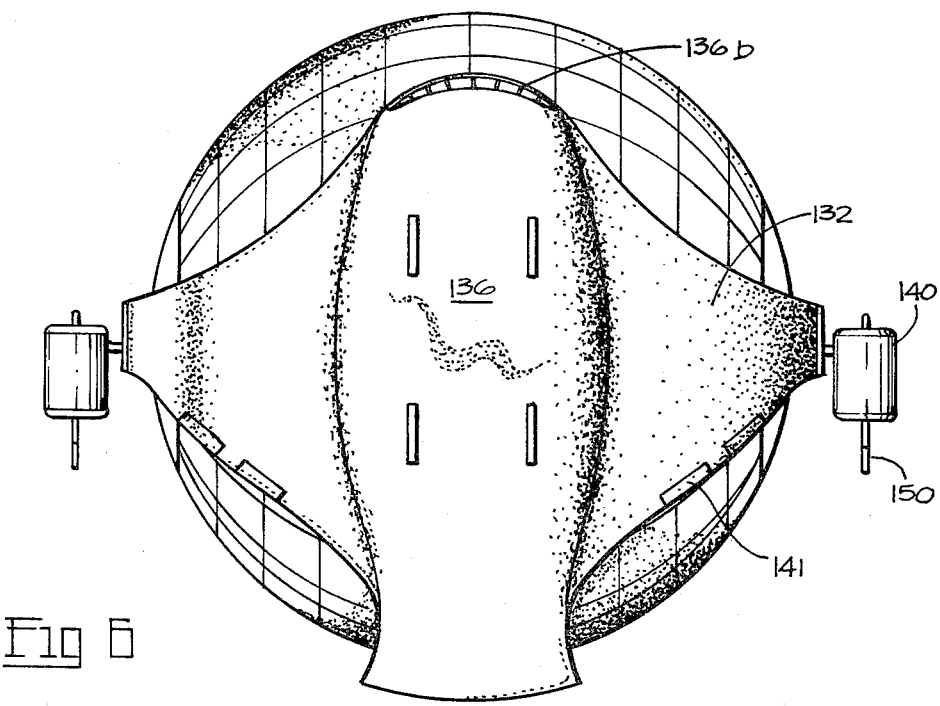

Further features of the invention will be described with reference to the accompanying drawings showing preferred embodiments of the invention, and in which:

FIG. 1 shows a side elevation of a dirigible airship in accordance with my invention, FIG. 2 shows a front view of the airship, FIG. 3 shows a diagrammatic detail view generally on lines 3—3 of FIG. 1, FIG. 4 shows a view similar to FIG. 1 of a modified form of my airship, FIG. 5 shows a front view of the airship of FIG. 4, and FIG. 6 shows an underside view of the airship of FIG. 4.

The airship shown in FIGS. 1 to 3 has buoyancy provided by non-rigid, spherical balloon or envelope 10 filled with helium at a pressure maintained at all times above about 1035 millibars. The balloon or envelope material will be a sandwich formed of Kevlar-29 fibre woven as a standard bias, weave, with a single heavy bias being incorporated every three inches, and with on the inside an adhered layer of bilaminated Mylar and on the outside an adhered sheet of aluminized Mylar. At each side of the balloon this material is bonded firmly to the edge portions of a circular, dished steel plate 14, and this plate also provides anchorage for cables 12 which extend in circumferential direction around the balloon between the two plates. The plate 14 has a central aperture which is welded around a hollow central axle 16 (see FIG. 3). The material of the balloon is fairly smooth in texture but the presence of cables 12 causes small bulges which provide a ribbed outer surface. The plate 14 is provided with a helium fill port 17 (normally closed) and a helium pressure regulating device 18 in the form of a motor driven valve which automatically vents helium to the atmosphere if the internal pressure of the balloon exceeds atmospheric pressure by 40 millibars or more.

The axle 16 supports a central ballonet 20 shown in outline in FIG. 2. This is an expandable enclosure having its two end portions tapered down and sealed to the axle at 22 and having its central portion maintained in expanded condition by a circular hoop 24 held spaced from the axle 14. The central portion of the axle within the ballonet has a cavity with ports connecting to the interior of the ballonet and also being in sealed communication with non-rotating supply tubes 28 the end of one of which is shown in FIG. 3. A dual blower air compressor (not shown) is provided at each end of the axle for supplying air through tube 28 to the ballonet to expand this against the pressure of the helium in balloon 10 to vary the buoyancy of the balloon. When fully expanded the ballonet is approximately circular in shape as indicated at 20' in FIG. 2.

The balloon does not include any substantial internal structure, as with a rigid airship, although there may be cables connecting the axle to points on the envelope to maintain the proper spherical shape of the balloon. The use of numerous separate gas bags, as used in the Hutson patent, is avoided, although there may be one or more dividers extending radially of the axle for separating the internal space into separate compartments. The distribution of lifting gas throughout the balloon is substantially uniform.

End portions 16a of the axle are rotatable in bearings 30 which are provided at the top ends of arms 32 of a load supporting yoke indicated generally at 34. These arms each contain an electric motor 35 which drives a gear train terminating in gear wheel 37 attached to the end of axle 16, these motors being arranged to rotate the axle and balloon in the direction shown in FIG. 1. A slipping clutch or like element may be included in the drive train to prevent undue rotational stress being applied to the balloon. As may be seen in FIG. 1 from the arrow at the bottom of the figure, the direction of travel of the airship is such that the forward face of the balloon is constantly rising. The rotation will be at a controlled but variable speed of a few r.p.m. The rotation and the ribbed surface of the balloon prevent laminar air flow, and provide turbulent flow that is accelerated (low pressure) on the upper side and retarded (higher pressure) on the lower surface, thus providing lift by the Magnus effect. Rotational speed will be selected to give suitable values of lift and will vary with airspeed.

The upper ends of arms 32 also carry variable pitch propeller, gas turbine engines 40 mounted on pods which can pivot about a horizontal axis coincident with that of axle 16, the engines being independently pivotable through 200° from a vertically upward to a vertically downward, slightly rearward direction. The variable pitch propellers also allow reversal of thrust so that the engines can serve to drive the airship in forward or rearward motion, lift or lower the airship, and in addition can tilt the airship about a central fore and aft axis or can rotate the airship about a vertical axis.

The central part of the load carrying yoke 34 is a gondola 36 which includes load engaging means in the form of cargo area 36a. Arms 32 are curved to conform to the shape of the balloon and to position the gondola 36 quite close to the bottom of the balloon, so that the distance separating the bottom of the balloon from the top of the gondola is preferably less than 1/10th of the balloon radius and in any event less than ⅓ of the balloon radius. This improves the manouverability of the airship as compared to a standard balloon construction where the gondola is supported by relatively long cables from the balloon and ensures that the balloon can be held reasonably firmly merely by mooring cables connected to the gondola. At the forward upper end of the gondola there is provided a cabin 36b for the crew members from where the airship is controlled. The cabin is pressurized to allow operation at high altitudes where drag on the airship is reduced. The base of the gondola has skids 38 provided for landing on solid ground, although pontoons may be used for water.

The arms 32 are elongated in the fore and aft direction and are streamlined (so that they resemble curved wings), and are provided with rudders 41. The main body of the gondola is generally of aerofoil form having a relatively high width to height ratio (say at least 6 to 1) along most of its length, the aerofoil shape providing additional lift during forward movement. The forward end of the gondola is raised and the top of the gondola body from the front end to the longitudinal centre has a curve conforming to the bottom of the balloon to provide a passage therebetween which is narrow relative to the height of the gondola. The tail section of the gondola has ailerons 42. The rudder 41 and ailersons 42 provide useful control in case of engine failure and may also be used to control swinging movements of the gondola.

FIGS. 4 to 6 shows an airship similar to that of FIGS. 1–3 but modified in the following respects:

(1) The balloon 110 is modified in that in addition to the circumferential cables 112, additional cables are provided defining a series of squares over the surface of the balloon. The balloon material bulges slightly between the cables to give a pillowed effect. The size of the irregularities is similar (proportionally to the balloon size) to the dimples of a golf ball, and the effect is intended to be similar to a golf ball in enhancing the Magnus effect and reducing drag.

(2) Instead of a single central ballonet, two ballonets 124 are used each located at one end of the rotational axis of the balloon. The end plates 114 are enlarged as compared to plates 14 of the first embodiment, and the flexible material of the ballonets 124 is connected and sealed around the periphery of each of the plates. When deflated the ballonet material lies in contact with or close to the end plate, and when inflated the ballonets assume a roughly hemispherical shape. Air is supplied to the ballonets through tubes similar to tubes 28 of the first embodiment, but here each ballonet is supplied by an independent compressor so that the amount of air in the ballonets can be regulated independently to assist the trimming the craft. Since the central axle 116 has no ballonet to support it may be of quite light construction, suitable merely for resisting axial loads, especially tensile load.

(3) The gondola 136 has its upper surface conforming very closely with the adjacent surface of the balloon; a major portion of the gondola upper surface may be situated less than 12 inches or less than around 2% of the balloon radius from the outermost extremities of the balloon surface. This is achieved by providing not only a concave curvature to a front portion of the gondola top which lies in front of the axle 116, but also to a lesser portion of the rear of the gondola top lying behind the axle 116 which conforms closely to the balloon curvature. This has the effect of restricting airflow between the balloon and the gondola, and of reducing the drag which would otherwise occur by reason of the roughened bottom surface of the balloon moving forward at perhaps twice the overall speed of the airship. In other words a substantial part of the lower surface of the balloon is blanked off by the gondola and as the airship moves forward air is deflected largely underneath the gondola which offers less resistance to flow than the underside of the balloon. The blanking effect continues to the side margins of the gondola since the gondola top surface is concave laterally as well as longitudinally, and the blanking effect continues at the lower portions of arms 132 which are wider in the fore-and-aft direction than in the first embodiment and are also concave internally longitudinally as well as laterally for about one half of their length.

(4) The engines 140 are mounted adjacent the upper ends of arms 132 but are situated below the rotational axis of the balloon by an amount equivalent to say 1/5 of the balloon radius, and are at least close to being aligned with the centre of gravity of the whole airship. This respositioning of the engines counteracts slight backwards sway of the gondola which will occur upon forwards acceleration with the engines positioned as in the first embodiment.

(5) Additional control surfaces are provided in the form of thrust deflectors 150 located behind the engines. The upper rudders 41 of the first embodiment are eliminated.

The following table give calculated figures for two models, designated 72P and 160P, which are respectively 72 and 160 ft. in diameter.

| LTA VEHICLE 20-1 DESIGN SPECIFICATIONS | | |
|---|---|---|
| Model designation | 72P | 160P |
| Sphere diameter (ft) | 72 | 160 |
| Total sphere volume (cu ft) | 195,500 | 2,144,500 |
| Total static lift (lb) | 12,900 | 140,600 |
| Net weight (lb) (without fuel) | 7,000 | 45,600 |
| Net static lift (lb) | 5,900 | 95,000 |
| Max. Magnus lift (lb) | 6,000 | 30,000 |
| Fuel load (lb) | 2,400 | 40,000 |
| Net disposable static lift (lb) | 3,500 | 55,000 |
| Net maximum disposable lift (lb) | 9,500 | 85,000 |
| Max. airspeed (mph) | 70 | 70 |

It may be noted that the figures for Magnus lift are very approximate pending large scale experiments.

It will be seen that Magnus lift can contribute substantially to the net maximum disposable lift, especially in smaller sizes of the airship. As size increases the total static lift increases with the cube of the balloon diameter whereas Magnus lift depends on the square of the balloon diameter so that relative amount of Magnus lift diminishes. However in the 160 ft. diameter model the Magnus lift is still more than one half the net disposable static lift, and even in sizes larger than 160 ft. dia the Magnus lift will be useful if greater than about 30% of the net disposable static lift. Since the Magnus lift depends on speed as well as rotation, in order to take off with a load greater than the net disposable static lift either the airship must be made to move along a runway, or engine thrust must be used to augment static lift; the latter alternative is preferred since the ability to hover is considered important. It is anticipated that during take-off the engines will be orientated so that at least 60% of total engine thrust will be directed downwards to augment the static lift during take-off, and the engines will then be inclined to the horizontal position to propel the airship in the forward direction while the balloon is rotated to supply the Magnus lift. Once cruising speed has been reached, the engines will be used primarily only for forward movement.

In order for the Magnus effect to contribute substantially to the payload, the engines should be capable of developing downwardly directed thrust which is at least 30% and preferably at least one half of the net disposable static lift; and the balloon surface characteristics and the means for rotating the balloon will be such that at cruising speed the Magnus lift will also be greater than respectively 30% or one half of the net maximum disposable lift. Even in very large sizes of airship where the contribution made by Magnus lift may be relatively small, rotation of the balloon is still likely to be useful in providing drag reduction in association with a closely conforming gondola blanking the lower part of the balloon.

The cabling pattern on the balloon may be more complex, and may, for example, give triangular pillowed areas. For this purpose the cables may be arranged in a pattern similar to that of a geodesic dome, or the cabling may be similar to a spherical icosahedron.

Also, the blanking effect which is described with reference to FIGS. 4 to 6 may be increased by having arms 132 extended rearwardly and conforming closely to the surface of the balloon.

I claim:

1. An aircraft comprising:
   a spherical non-elastic balloon for containing a buoyant gas and having essentially fixed dimensions and shape when inflated,
   a rigid load supporting yoke including two arms extending upwardly from central load engaging means and each with an upper end, said yoke arms being curved to conform with the balloon curvature and to support the load engaging means in such position that the gap separating the outer surface of the balloon from the adjacent surface of the load engaging means is less than $\frac{1}{3}$ of the balloon radius,
   means rotatably connecting the upper ends of said arms to the balloon in such manner as to allow the balloon to rotate about a normally horizontal axis passing through the centre of the balloon,
   means for propelling the aircraft through the air in a forward direction transverse to said axis, and
   means for rotating the balloon about said horizontal axis in such direction that the surface of the balloon facing said forward direction moves upwards relative to the centre of the balloon.

2. An aircraft according to claim 1 wherein said central load engaging means is provided by a gondola of generally aerofoil form having a width to height ratio of at least 6 to 1, and wherein the gap separating the top of the gondola from the balloon is less than 1/10 the radius of the balloon.

3. An aircraft according to claim 2 wherein said gondola includes a raised upper front end, the top of the gondola body from said front end to the longitudinal center thereof having a curve conforming to the bottom of the balloon to provide a passage therebetween which has a height less than 1/10 the radius of the balloon.

4. An aircraft according to claim 3 wherein said gondola has a major portion of its upper surface shaped to conform to the balloon surface and spaced from said surface by an amount less than 2% of the balloon radius.

5. An aircraft according to claim 3 or claim 4 wherein said gondola includes a rear portion lying normally behind said horizontal axis and which curves upwardly from the longitudinal centre of the balloon to conform to the balloon surface.

6. An aircraft according to claim 3 or claim 4 wherein a major portion of the upper surface of said gondola and adjacent parts of said arms are concave both laterally and longitudinally to conform to the balloon surface.

7. An aircraft according to claim 1, wherein said arms are elongated in the fore-and-aft direction and are streamlined, and wherein control surfaces are provided on said arms below said horizontal axis to assist in steering the aircraft.

8. An aircraft according to claim 1 wherein said means for propelling the aircraft comprises a pair of engines each mounted adjacent the upper end of one of said arms so as to be spaced apart at a distance greater than the diameter of said balloon, said engines being mounted on means allowing pivoting of said engines about lateral horizontal axes, and being connected to individual control means, whereby said engines may be used to assist in lowering or raising the aircraft, in steering the aircraft, and in tilting the aircraft about a fore-and-aft axis.

9. An aircraft comprising:
a spherical non-elastic balloon for containing a buoyant gas and having substantially fixed dimensions and shape when inflated,
a rigid load supporting yoke including two arms extending upwardly from central load engaging means and each with an upper end, said arms being elongated in the fore-and-aft direction and being streamlined,
means rotatably connecting the upper ends of said arms to the balloon in such manner as to allow the balloon to rotate about a normally horizontally axis passing through the centre of the balloon,
means for propelling the aircraft through the air in a forward direction transverse to said axis,
means for rotating the balloon about said horizontal axis in such direction that the surface of the balloon facing said forward direction moves upwards relative to the centre of the balloon, and
conrtrol surfaces on said arms below said horizontal axis for assisting in steering the craft.

10. An aircraft according to claim 9 wherein said means for propelling the aircraft comprises a pair of engines each mounted adjacent the upper end of one of said arms so as to be spaced apart at a distance greater than the diameter of said balloon, said engines being mounted on means allowing pivoting of said engines about lateral horizontal axes, and being connected to individual control means, whereby said engines may be used to assist in lowering or raising the aircraft, in steering the aircraft, and in tilting the aircraft about a fore-and-aft axis.

11. An aircraft according to claim 10, wherein the means connecting the upper ends of the arms to the balloon include an axle which is co-axial with said horizontal axis of the balloon, and a plate adjacent each end of said axle and having a central aperture within which said axle is fixed, said plates being connected to fabric forming said balloon.

12. An aircraft comprising:
a spherical non-elastic balloon for containing a buoyant gas and having essentially fixed dimensions and shape when inflated,
a rigid load supporting yoke including two arms extending upwardly from central load engaging means and each with an upper end,
means rotatably connecting the upper ends of said arms to the balloon in such manner as to allow the balloon to rotate about a normally horizontal axis passing through the centre of the balloon,
means for propelling the aircraft through the air in a forward direction transverse to said axis, and
means for rotating the balloon about said horizontal axis in such direction that the surface of the balloon facing said forward direction moves upwards relative to the centre of the balloon,
wherein said means for propelling the aircraft comprises a pair of engines each mounted adjacent the upper end of one of said arms so as to be spaced apart at a distance greater than the diameter of said balloon, said engines being mounted on means allowing pivoting of said engines about lateral horizontal axes, and being connected to individual control means, whereby said engines may be used to assist in lowering or raising the aircraft, in steering the aircraft, and in tilting the aircraft about a fore-and-aft axis.

13. An aircraft according to any one of claims 1, 2, 3, 7, 9, 8, or 12, wherein the means connecting the upper ends of the arms to the balloon include an axle which is co-axial with said horizontal axis of the balloon, and a plate adjacent each end of said axle and having a central aperture within which said axle is fixed, said plates being connected to fabric forming said balloon.

14. An aircraft according to any of claims 1, 9, or 12 wherein the balloon has a non-smooth surface.

15. An aircraft according to any of claims 1, 9 or 12 wherein said balloon has a non-smooth surface which is such as substantially to prevent laminar flow over the balloon.

16. An aircraft according to any of claims 1, 9, and 12, wherein said balloon encloses an air-containing ballonet, and wherein compressor means are provided to supply atmospheric air to said ballonet at pressure higher than that of the buoyant gas, to control the buoyancy of the aircraft.

17. An aircraft according to any of claims 1, 9 or 12, wherein the balloon has a non-smooth surface provided by bulges, situated between reinforcing cables lying along the balloon surface.

18. An aircraft according to claim 12, wherein said engines are independently pivotable.

19. An aircraft according to any of claims 1, 9 or 12, including means whereby thrust from said propelling means can be directed at least partly downwardly to assist in lifting the aircraft.

20. An aircraft according to any of claims 1, 9 or 12, wherein said means for propelling said aircraft in a forward direction are engines which are capable of developing downwardly directed thrust which is at least 30% the net disposable static lift, and wherein the means for rotating the balloon, and the balloon surface characteristics, are such that in forward flight the balloon generates a Magnus lift equivalent to at least 30% said net disposable static lift.

21. An aircraft according to any of claims 1, 9 or 12, wherein said means for propelling said aircraft in a forward direction are engines which are capable of developing downwardly directed thrust which is at least one half the net disposable static lift, and wherein the means for rotating the balloon, and the balloon surface characteristics, are such that in forward flight the balloon generates a Magnus lift equivalent to at least one half said net disposable static lift.

22. An aircraft according to any of claims 1, 9 or 12, wherein means are provided to allow at least 60% of total engine thrust to be directed downwardly to assist in take-off.

23. A method of operating the aircraft defined in claim 12 which includes using downwardly directed thrust from the engines to lift the aircraft off the ground when carrying a load greater than the net disposable static lift provided by the balloon, inclining the engines to propel the aircraft in said forward direction, and rotating the balloon so that the Magnus lift generated by the rotation and forward motion maintains support for the load, and thereafter using the engines primarily for forward movement.

24. An aircraft comprising:

a spherical non-elastic balloon for containing a buoyant gas and having essentially fixed dimensions and shape when inflated, said balloon being mounted on a normally horizontal axle passing through its centre, a rigid load supporting yoke including two arms extending upwardly from central load engaging means and each with an upper end, means rotatably connecting the upper ends of said arms to the axle in such manner as to allow the balloon to rotate about said axle, an air containing ballonet held at its centre by a circular hoop the centre of which is held at the midpoint of said axle, side portions of the ballonet being sealed to said axle, the arrangement being such that the ballonet is held centrally within the balloon by said axle, compressor means for supplying pressurized air to said ballonet via said axle.

25. An aircraft comprising:
a spherical non-elastic balloon for containing a buoyant gas and having essentially fixed dimensions and shape when inflated, end plates secured to said balloon on opposite ends of a central axis passing through the centre of the balloon, a rigid load supporting yoke including two arms extendinfg upwardly from central load engaging means and each with an upper end, means rotatably connecting the upper ends of said arms to the end plates in such manner as to allow the balloon to rotate about said central axis, two air containing ballonets each comprising flexible material having its periphery sealed to one of said end plates, compressor means for supplying pressurized air through conduits in said arms to each of said ballonets, and means for separately controlling the air supply to the ballonets for trimming the aircraft.

26. An aircraft according to any of claims 9, 12, 24 and 25, wherein said load supporting yoke arms are curved to conform with the balloon curvature and to support the load engaging means in such position that the gap separating the outer surface of the balloon from the adjacent surface of said load engaging means is less than $\frac{1}{5}$ of the balloon radius.

27. An aircraft according to claim 24 or claim 25, including means for propelling said aircraft in a forward direction, and means for rotating the balloon about the said axle in such manner that the surface of the balloon facing said forward direction moves upwards relative to the centre of the balloon.

28. An aircraft according to any of claims 9, 12, 24 and 25, wherein said load supporting yoke arms are curved to conform with the balloon curvature and to support the load engaging means in such position that the gap separating the outer surface of the balloon from the adjacent surface of said load engaging means is less than 1/10 of the balloon radius.

29. An aircraft according to any of claims 9, 12, 24 and 25 wherein said yoke arms are curved to conform with the balloon curvature, and wherein said load engaging means is a gondola having a major portion of its upper surface shaped to conform to the balloon surface and spaced less than 12 inches from said surface.

30. An aircraft comprising:
a spherical non-elastic, balloon which is not rigid for containing a buoyant gas and having essentially fixed dimensions and shape when inflated, a rigid load supporting yoke including two arms extending upwardly from central load engaging means and each with an upper end, said yoke arms being curved to conform with the balloon curvature and to support the load engaging means in such position that the gap separating the outer surface of the balloon from the adjacent surface of the load engaging means is less than $\frac{1}{5}$ of the balloon radius, means rotatably connecting the upper ends of said arms to the balloon in such manner as to allow the balloon to rotate about a normally horizontal axis passing through the center of the balloon, means for propelling the aircraft through the air in a forward direction transverse to said axis, and means for rotating the balloon about said horizontal axis in such direction that the surface of the balloon facing said forward direction moves upwards relative to the center of the balloon.

* * * * *